United States Patent
Macheras et al.

(10) Patent No.: US 6,709,494 B2
(45) Date of Patent: Mar. 23, 2004

(54) HIGH TEMPERATURE MEMBRANE MODULE TUBESHEET COMPOSED OF THERMOSET RESIN BLENDS

(75) Inventors: James Timothy Macheras, Quincy, MA (US); Salvatore Giglia, Norwood, MA (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 10/289,248

(22) Filed: Nov. 7, 2002

(65) Prior Publication Data

US 2003/0159583 A1 Aug. 28, 2003

Related U.S. Application Data

(60) Provisional application No. 60/359,880, filed on Feb. 26, 2002.

(51) Int. Cl.[7] .......................... B01D 63/02; B01D 69/08
(52) U.S. Cl. ...................................... 96/8; 96/10; 96/14
(58) Field of Search ............................ 96/8, 10, 13, 14

(56) References Cited

U.S. PATENT DOCUMENTS

| | | | |
|---|---|---|---|
| 4,323,453 A | * 4/1982 | Zampini | 210/321.61 |
| 4,323,454 A | * 4/1982 | Fritzsche et al. | 210/321.61 |
| 4,961,760 A | * 10/1990 | Caskey et al. | 210/321.89 |
| 5,013,437 A | * 5/1991 | Trimmer et al. | 210/321.78 |
| 5,059,374 A | * 10/1991 | Krueger et al. | 264/156 |
| 5,087,314 A | 2/1992 | Sandborn et al. | 156/330 |
| 5,211,728 A | * 5/1993 | Trimmer | 95/47 |
| 5,234,590 A | 8/1993 | Etienne et al. | 210/321.61 |
| 5,282,966 A | 2/1994 | Walker | 210/321.8 |
| 5,885,454 A | * 3/1999 | Yagihashi et al. | 210/321.78 |
| 6,136,073 A | * 10/2000 | Coan et al. | 96/8 |
| 6,153,097 A | * 11/2000 | Jensvold et al. | 210/321.81 |
| 6,228,474 B1 | 5/2001 | Kishi et al. | 428/297.4 |
| 6,248,204 B1 | 6/2001 | Schuft | 156/305 |
| 6,290,756 B1 | * 9/2001 | Macheras et al. | 96/8 |

* cited by examiner

Primary Examiner—Robert H. Spitzer
(74) Attorney, Agent, or Firm—David M. Rosenblum

(57) ABSTRACT

Tubesheet materials for hollow fiber membrane module are disclosed using materials to provide for improved performance at high temperatures. The tubesheets are cast from a mixture of solidifiable resinous components that are designed to provide desirable processing characteristics to the mixture in its initial liquid state, as well as improved thermal properties its final cured casting state.

7 Claims, No Drawings

HIGH TEMPERATURE MEMBRANE MODULE TUBESHEET COMPOSED OF THERMOSET RESIN BLENDS

This application claims the benefit of Provisional application Ser. No. 60/359,880, filed Feb. 26, 2002.

FIELD OF THE INVENTION

This invention relates to semipermeable hollow fiber membrane devices that contain tubesheets with improved temperature capability. The physical characteristics of the uncured liquid potting compound have been tailored to facilitate the impregnation of the hollow fiber membrane bundle with said compound. Subsequent elevated temperature curing of this resinous material produces highly crosslinked castings with high glass transition temperatures.

BACKGROUND OF THE INVENTION

Processes that use membranes to separate mixtures of fluids including gases are accepted applications in many industries. Representative of these processes are microfiltration, ultrafiltration, reverse osmosis and gas separation. Membranes used to accomplish these separations have been fabricated in various geometries, such as flat sheet, spiral wound flat sheet, tubular and hollow fibers. The membrane geometry is usually dictated by the nature of the separation that is to be effected. When performing a separation on a viscous liquid mixture, for instance, it may be advantageous to use a membrane in a large diameter, tubular configuration in order to maintain fluid velocity and to minimize fouling of the membrane surface. Conversely, when separating fluids with low viscosities, such as gases, the use of membranes in a hollow fiber configuration is more appropriate.

The fine hollow fiber geometry for membrane fabrication is particularly advantageous because it can yield very high surface area-to-volume ratios. Much of this benefit is derived from the fact that the membrane support structure is integral to the hollow fiber; that is, in contrast to flat sheet membranes that are cast onto a nonwoven fabric, or to tubular membranes that are frequently cast onto a rigid porous backing tube. Thus a significant portion of the module volume of flat sheet, spiral wound, and tubular membranes is consumed by the membrane support structure. This volume is consequently unavailable for packing such modules with additional active membrane area.

Commercially large bundles of hollow fiber membranes are assembled into permeators or modules. The fibers in these modules are sometimes arranged in a parallel fashion, although it is often advantageous to wind the fibers around a core in order to impart structural integrity to the bundle. As part of the hollow fiber membrane module manufacturing process, at least one end of the fiber bundle is cast or potted in what is commonly referred to as a tubesheet. More commonly both ends of the bundle are so encapsulated. The tubesheet serves to hold the fibers in a fluid-tight relationship such that the feed fluid is isolated from the permeate fluid, thus allowing components to be separated by selective passage of one or more components through the membrane.

Tubesheets can be fabricated from any one of a number of liquid resinous materials that subsequently solidify, frequently through a chemical curing process. Among the preferred such resinous materials used as potting compounds are epoxy resins. Such resins are valued for the strength and durability of castings that can be produced from properly formulated mixtures that incorporate such resins. It is further recognized that there exists a large selection of commercially available raw materials that can be utilized to formulate these compounds. Thus tubesheet materials composed with epoxy resins can be tailored to meet the demands of various process applications.

The selection of a material for fabricating a membrane module tubesheet is dependent upon the properties of said material in both the cured, solid state and the uncured, liquid state. The properties of the material in each phase are important but for different reasons.

The properties of the cured resinous composition must meet the demands of the particular application of the membrane module. With respect to hollow fiber membrane modules used for gas separation, there are several properties of the tubesheet that are desirable. First, the cured resin must be of sufficient strength to withstand the pressure differential across the tubesheet during operation of the module. The feed pressure of the gas can be in excess of 80 atmospheres and consequently the pressure differential across the tubesheet will approach this value if the permeate pressure of the membrane approaches atmospheric pressure. In addition, the solidified resinous mixture comprising the tubesheet must be resistant to chemicals in the process fluid, including water vapor. Further, the tubesheet must be amenable to being cut or severed in a clean fashion such that the bores of the fibers can be opened to allow free passage of gas along the length of the hollow fibers. The cured resin must exhibit sufficient adhesion to the hollow fibers in order to maintain a fluid-tight relationship between the hollow fibers and the tubesheet, thus preventing unwanted species in the feed stream from mixing with the permeate. When a membrane module is to be operated at elevated temperature, it is essential that all structural components, including the tubesheet, be rated accordingly. Although cured epoxy resins are crosslinked materials, like all polymeric materials they are susceptible to creep when subjected to excessive pressure and temperatures. Heat and pressure induced deformation of a membrane module tubesheet can cause either gross mechanical failure of the tubesheet or a failure in the fluid-tight seal between the fibers and the tubesheet. Either condition can result in failure of the membrane module to operate as intended. The resistance of an epoxy resin to this type of failure is related to its glass transition temperature, $T_g$. A cured resin is more susceptible to creep as it is subjected to temperatures approaching its $T_g$. Therefore, it is desirable that the tubesheet material has $T_g$ well in excess of its intended operating temperature in order to provide an adequate margin of safety.

The properties of the uncured resinous material used to form the tubesheet must be given equal consideration, for the controlled and facile application of the liquid resinous compound into the hollow fiber membrane bundle is essential to the production of reliable commercial permeators. The liquid resin may be applied to the ends of the hollow fiber bundle by any suitable means. One method is directed by Fritzsche et al. in U.S. Pat. No. 4,323,454. The authors describe a process in which a hollow fiber bundle is placed in a mold while a liquid resinous composition of relatively low viscosity is poured into said mold. The liquid resinous material is then free to migrate through the interstices between the hollow fibers until the fibers are encapsulated. This method, and variations of it, is particularly amenable to large-scale production of commercial membrane modules. It is apparent, however, that if module potting is to be conducted by this method, the liquid resin properties must be carefully selected. Commercial membrane modules can comprise bundles of hollow fibers that range from 5 cm in diameter up to 15 cm in diameter, and frequently are as high as 30 cm in diameter. Those skilled in the art will recognize that to achieve complete penetration of a liquid resin throughout a 30 cm diameter bundle of hollow fibers is significantly more challenging that the encapsulation of a 5 cm diameter bundle.

Of paramount consideration, therefore, when selecting a liquid resinous compound for tubesheet formation, is the ability to control the manner in which it flows into the hollow fiber bundle such that all fibers are encapsulated. Two properties of liquid resins that define their ability to flow are viscosity and gel time. Viscosity is a measure of the liquid's thickness while gel time is an indicator of the time that a resinous material remains in a liquid state before it ceases to flow. It is desirable, then, that the liquid resinous compound has a viscosity that is low enough for a sufficient time before its gels such that all fibers in the hollow fiber bundle are adequately encapsulated. It is important to note, however, that liquid resinous compounds with excessively long gel times or inordinately low viscosities can be wholly unsuitable for forming permeator tubesheets. Compounds possessing these characteristics can lead to inefficient production rates due to the extended times required to solidify such low reactivity resins. Furthermore, very low viscosity resins are often prone to chemically attack the thermoplastic hollow fibers in the membrane bundle. Low viscosity resins also exacerbate a condition known as wicking, in which the liquid potting compound is drawn up the exterior of the hollow fibers by capillary action. This condition is completely undesirable in the manufacture of hollow fiber membrane modules because any portion of the hollow fiber that is coated with this wicked resin is unavailable to perform any fluid separation. While these capillary forces can never be eliminated, they can be diminished through the use of sufficiently viscous resins, thus minimizing the membrane surface area that is rendered inactive.

It is also desirable to employ a liquid resinous compound that can be gelled into a semi-solid state or "B" stage prior to being completely cured at elevated temperature. The use of a system that gels in this matter prior to final cure allows better control of the heat transfer to the casting curing post cure. This minimizes the danger of uncontrollable exotherm and minimizes the stress in the casting. Because the mass of potting compound used to encapsulate an end of a commercial membrane module can be as high as 5 kilograms, it is important that the reactivity of the liquid resin be manageable.

All of the aforementioned properties of both the liquid and cured potting compounds are influenced by the choice of resin and hardener components. The viscosity of a liquid system, however, is largely influenced by the choice of resin components because the combining ratios of epoxy systems usually demand more resin than hardener. The $T_g$ of the cured casting can also be influenced by the resin component. Typically, resins with high epoxide functionality produce castings with higher $T_g$'s.

The use of epoxy resins for forming hollow fiber membrane tubesheets has been taught in prior art. Etienne et al. in U.S. Pat. No. 5,234,590 teach the use of glycidyl ethers and epoxy compounds of various types for this purpose. The authors are silent, however, on the notion of blending such resins and do not teach the advantages of so doing. Similarly, Walker in U.S. Pat. No. 5,282,966 makes no mention of blending epoxy resins for use as tubesheet compounds. The blending of epoxy resin compounds for other applications is well known, however. Kishi et al. in U.S. Pat. No. 6,228,474 report blends of monofunctional or bifunctional epoxy resins with trifunctional or high functional epoxy resins. These blends have specific epoxy equivalent weights and also dictate the use of a rubber component such that the mixture is suitable for a yarn prepreg. Sanborn et al. in U.S. Pat. No. 5,087,314 teach the use of high functionality epoxy resin blends, which are used to make electrically conductive adhesives.

Thus, while the use of epoxy resins for forming hollow fiber membrane tubesheets is well known, and while the practice of blending epoxy resins to tailor material properties is also well known, the use of specific resin blends to form high temperature resistant hollow fiber membrane tubesheets is heretofore unknown. The prior art has not taught a method for easily preparing such tubesheets for commercial membrane modules. Because it is frequently economically advantageous to operate membrane modules at elevated temperatures, a need exists in the market for materials and processes to construct tubesheets for such applications.

OBJECTIVE OF THE INVENTION

It is an object of this invention to disclose materials for manufacturing hollow fiber membrane module tubesheets with improved temperature capability. It is a further object of this invention to disclose a process for encapsulating hollow fibers with said compounds to form a high temperature capable tubesheet.

SUMMARY OF THE INVENTION

This invention pertains to materials and methods used to produce tubesheets that lead to improved performance of fluid separation hollow fiber membrane modules, particularly gas separation modules. The improvements in module performance are achieved through the use of specific epoxy resin blends used to fabricate the module tubesheets. The improvement in module performance is manifest by its ability to operate at higher temperatures than modules constructed according to methods in the prior art.

The resin blends of the present invention are formulated from two distinct classes of multifunctional epoxy resins. The blends are formulated to permit ease of encapsulation of the hollow fiber while the potting compound is in the liquid stage and to yield tubesheets with high glass transition temperature after the resinous mixture is cured at an elevated temperature.

The tubesheets of the present invention include tubesheets that both separate feed from the permeate end and operate under cross differential pressure and hollow fiber bundle caps. Furthermore, the invention relates to both shell side and bore side feed modules. Novel processes to manufacture high temperature capable tubesheets are further disclosed.

DETAILED DESCRIPTION OF THE INVENTION

The tubesheets of this invention are formed by utilizing a two component resin system for the potting compound. The first component consists of one or more Type A resins. A Type A resin is defined as an epoxy resin that has all of its reactive epoxide groups bound to a carbon atom through an ether linkage. Further, Type A resins must have an epoxy functionality >2. Representative of Type A resin are epoxyphenol novolacs, epoxycresol novolacs, and the triglycidyl ether of trishydroxyphenyl methane. The second component consists of one or more Type B resins. A Type B resin is defined as an epoxy resin that has at least one of its reactive epoxy groups bound to a nitrogen atom. Representative of Type B resins are the polyglycidyl ethers of paraaminophenol and N,N,N',N'-tetraglycidyl-4,4'-methylenebis benzeneamine.

In addition to the aforementioned resins, the potting compounds used to form the tubesheets of this invention include a hardener component. Typical epoxy hardeners include, but are not limited to, aromatic amines, polyamides, polyamidoamines, and cycloaliphatic amines, and aliphatic amines. In addition, the potting compound may contain fillers, additives, and flow control agents as required.

It has been noted that in the fabrication process for some commercial hollow fiber permeators that it is desirable to have a potting compound with a viscosity low enough that it will flow through the fiber interstices so as to encapsulate all fibers, yet not so low that it causes undue wicking on the hollow fiber walls. It has been found that for this purpose, the viscosity at 25° C. of such resinous mixtures should preferably be between about 10,000 cps and 500 cps. More preferably, it should be between about 7500 cps and 750 cps, and most preferably between 5000 cps and 1000 cps.

It has also been noted that the gel time of the potting compound should be long enough to allow penetration of the liquid resinous mixture into the fiber bundle, but not so long as to promote chemical attack on the thermoplastic hollow fibers or to hinder efficient use of manufacturing equipment from excessively long cycle times. For this purpose, the gel time of a compound was measured in a mass of 150 grams on a Gardco GS gel timer. It has been found that a gel time between 180 minutes and 600 minutes is preferable, while a gel time between 200 minutes and 500 minutes is most preferable.

While the use of Type A resins for the production of tubesheets has been taught, when used as a sole resin component the resulting potting compound is difficult to process in the liquid state. Such multifunctional resins typically have room temperature viscosities of at least 50,000 cps and, in some cases, they are solid materials at room temperature. Even when combined with liquid hardener components, a suitably viscous, high $T_g$ potting compound is difficult to formulate. Type B resins, on the other hand, have been found to react too slowly in some instances to be of practical commercial use. For example, a 1 kilogram mass of a commercially available Type B resin (N,N,N', N'-Tetraglycidyl-4, 4'methylenebisbenzenamine) known as Araldite® MY721, sold by Vantico Inc., mixed with a stoichiometric amount of an aromatic/aliphatic amine blend hardener, had not fully gelled after 24 hours at room temperature. Similarly, another Type B resin known as Araldite® MY0510 (diglycidyl ether of paraaminophenol) took 8 hours to react under these conditions. This type of sluggish reactivity does not lend itself to efficient production of commercial membrane modules. Thus, there are deficiencies in the handling characteristics of potting compounds formulated with only Type A or Type B resins alone.

It was found, surprisingly, that blends of these two resin types could be used to formulate potting compounds with desirable viscosity and pot life characteristics. It is preferred that the ratio of Type A to Type B resin be from about 10:1 to about 1:10. It is more preferable that this ratio is from about 4:1 to 1:4, and most preferably if it is from about 3:1 to 1:3. Furthermore, it was found that such potting compounds produced castings with very high $T_g$'s when subjected to appropriate high temperature cures. Curing is performed at preferably at least 150° C., more preferably at 160° C., and most preferably at 170° C. or more.

High $T_g$ casting compounds are frequently required for high temperature gas separation applications. It is sometimes required that membrane modules process feed streams at temperatures of 80–100° C. or even higher. It is desirable that the $T_g$ of the module tubesheet be well in excess of this temperature in order to provide a margin of safety against the tendency of the polymeric compound to creep under temperature and pressure. Tubesheets of the present invention are well suited to this task by virtue of their high $T_g$ derived in part from the highly functionalized resins used to prepare these potting compounds. When membrane modules operate in the temperature range described above, it is preferable to utilize tubesheet compounds with $T_g$'s in excess of 160° C. It is more preferable that the $T_g$ exceeds 170° C., and most preferable if it exceeds 180° C.

The following specific examples will serve to further illustrate the utility of this invention.

EXAMPLE 1

75 parts by weight of a Type A resin, sold commercially by Shell under the trade name Epon® 160 (phenol formaldehyde novolac polyglycidl ether), was mixed with 25 parts by weight of a Type B resin sold commercially by Vantico Inc. as MY0510® (4-glycidyloxy-N,N-diglycidyl aniline). This resin blend, which has a theoretical epoxy functionality of >2.5, was mixed with a stoichiometric amount of an epoxy hardener comprised of a blend of cycloaliphatic and aromatic amines. This resin/hardener mixture had a viscosity of 3220 cps and a gel time of 219 minutes. Thus, it was a suitable tubesheet forming compound for commercial hollow fiber membrane modules. This material when fully cured at 175° C. had a $T_g$ of 184° C. and was thus suitable for high temperature service.

EXAMPLE 2

50 parts by weight of a Type A resin sold commercially by Vantico Inc. under the name of Tactix® 742 (1,1,1-tris(p-hydroxyphenyl)ethane trigycidyl ether) was mixed with 50 parts by weight of a Type B resin, MY510 (4-glycidyloxy-N,N-diglycidyl aniline). This resin blend, which has a theoretical epoxy functionality of 3, was mixed with a stoichiometric amount of an epoxy resin hardener comprised of cycloaliphatic and aromatic amines. This resin/hardener mixture had a viscosity of 4720 cps and a gel time of 269 minutes. Thus, it was a suitable tubesheet forming compound for commercial hollow fiber membrane modules. This material when fully cured at 175° C. had a $T_g$ of 195° C. and was thus suitable for high temperature service.

Comparative Example 1

100 parts by weight of a Type A resin, Epon® 160 (phenol formaldehyde novolac polyglycidyl ether), which has a theoretical epoxy functionality of 2.5, was mixed with a stoichiometric amount of the same epoxy resin hardener used in Example 1. This resin/hardener mixture had a viscosity of 11,420 cps and a gel time of 155 minutes. This compound was therefore unsuitable for the fabrication of commercial hollow fiber membrane modules.

Comparative Example 2

An epoxy resin sold commercially by Shell under the name of Epon® 826 (bisphenol A/epichlorohydrin epoxy resin) was used to formulate a potting compound. Because this epoxy does not have a theoretical epoxy functionality >2, it does not qualify as a Type A resin. Because it has no epoxide groups bound to nitrogen atoms, it does not qualify as a Type B resin. Epon® 826 was mixed with a stoichiometric amount of the same hardener used in Example 1. This resin/hardener mixture had a viscosity of 2938 cps and a gel time of 283 minutes. Thus it was a suitable potting compound for commercial hollow fiber membrane modules. This material when cured at 175° C. had a $T_g$ of 160° C. Therefore, this material is not suitable for high temperature service.

EXAMPLE 3

A hollow fiber membrane module was constructed using the tubesheet forming compound described in Example 1. This membrane module was run as a bore side feed air separation device. The module was operated at an inlet pressure of 65 psig at temperatures between 82° C. and 107° C. This module accumulated 3460 hours of running time with no sign of tubesheet failure.

Comparative Example 3

A hollow fiber membrane module was constructed in a manner identical to that in Example 3 except that the tubesheet forming compound was the material described in Comparative Example 2. This module was operated under the same conditions described in Example 3. After 1600 hours, however, this tubesheet suffered catastrophic mechanical failure, such that a fluid-tight seal between the feed and permeate gases could not be maintained.

EXAMPLE 4

A commercial size hollow fiber membrane module of approximately 27 cm diameter was constructed using the tubesheet forming material described in Example 1. This membrane module was run as a bore side feed air separation device at a temperature of 82° C. This module had a separation factor for oxygen/nitrogen of 3.0 at 50 psi, indicating that the hollow fiber bundle was encapsulated by the tubesheet compound such that a fluid tight relationship was maintained between the feed and permeate gases.

Comparative Example 4

Attempts were made to construct commercial hollow fiber membrane modules identical to that described in Example 4 except that the tubesheet forming compound was that as described in Comparative Example 1. It was found that the viscosity and pot life characteristics of the liquid potting compound made it impossible to completely encapsulate all hollow fibers in the module. Thus a fluid-tight seal between the feed and permeate fluids could not be achieved. Thus this material is not useful as a commercial membrane tubesheet compound.

What is claimed is:

1. A membrane separation module for the separation of gaseous components at high temperature, said module comprising a bundle of gas separation hollow fiber membranes, each of said membranes having at least one region that is encapsulated by a tubesheet, and an active membrane that is not encapsulated by said tubesheet; a tubesheet forming compound is comprised of:
   a) an epoxy resin first component comprised of one or more Type A resins, wherein all epoxy reactive groups are bonded through an ether linkage to carbon atoms, said resins having an epoxy functionality >2;
   b) an epoxy resin second component comprised of one or more Type B resins, wherein at least one epoxy reactive group is bonded to a nitrogen atom, said resins having an epoxy functionality >2; and
   c) an epoxy resin hardener.

2. A membrane separation module of claim 1 wherein the ratio of Type A resins to Type B resins is about 10:1 to about 1:10.

3. A membrane separation module of claim 1 wherein the Type A epoxy resin is an epoxyphenol novolac, an epoxycresol novolac, or a polyglycidylether of trishydroxyphenyl methane.

4. A membrane separation module of claim 1 wherein the Type B epoxy resin is a polyglycidylether of paraaminophenol or N,N,N',N'-tetraglycidyl-4,4'-methylenebis benzeneamine.

5. A membrane separation module of claim 1 wherein the epoxy resin hardener consists of one or more compounds consisting of an aliphatic amine, aromatic amine, or cycloaliphatic amine and blends thereof.

6. A membrane separation module of claim 1 wherein the viscosity of the mixture of the epoxy resins in steps a), b) and C) in its liquid state is less than about 10,000 cps at 25° C. and more than about 500 cps at 25° C.

7. A membrane separation module of claim 1 wherein the mixture of the epoxy resins in steps a), b) and C) has a gel time of more than about 100 minutes.

* * * * *